United States Patent [19]

Leigh-Monstevens et al.

[11] Patent Number: 4,865,173
[45] Date of Patent: Sep. 12, 1989

[54] ELECTRIC CLUTCH ACTUATOR

[75] Inventors: Keith V. Leigh-Monstevens, Troy; Brian D. Mabee, Warren, both of Mich.

[73] Assignee: Automotive Products plc, Warwickshire, England

[21] Appl. No.: 119,970

[22] Filed: Nov. 13, 1987

[51] Int. Cl.$^4$ .................... F16D 23/14; B60K 41/22
[52] U.S. Cl. .................. 192/0.02 R; 192/3.56; 192/90; 192/94; 192/98
[58] Field of Search ............ 192/90, 94, 84 R, 3.56, 192/0.02 R, 97, 98

[56] References Cited

U.S. PATENT DOCUMENTS

| | | |
|---|---|---|
| 1,635,068 | 6/1925 | Bing . |
| 2,072,832 | 3/1937 | Weydell ........................ 192/90 X |
| 2,823,778 | 2/1958 | Binder ........................... 192/90 X |
| 4,505,364 | 3/1985 | Goucher et al. ............. 192/0.02 R |
| 4,648,498 | 3/1987 | Herbulot et al. .................. 192/94 |

FOREIGN PATENT DOCUMENTS

2516998  5/1983  France .

Primary Examiner—Rodney H. Bonck
Attorney, Agent, or Firm—Krass & Young

[57] ABSTRACT

An electric actuator for use in engaging and disengaging the clutch of a manual transmission motor vehicle. The actuator comprises an electric motor which is sized to be positioned within the housing of the clutch. The motor includes an annular armature assembly which is positioned concentrically around the clutch shaft and which drives a nut member which in turn drives a screw member to move the release bearing linearly to engage and disengage the clutch. In one embodiment, the nut and screw comprise an acme thread arrangement and in another embodiment the nut and screw are of the ball type. In one embodiment the screw advances linearly in response to rotation of the armature assembly and in another embodiment the housing and armature assembly advance linearly in response to rotation of the armature assembly while the screw remains fixed. In each of the embodiments, the motor housing, the armature assembly, the nut member, and the screw are respectively positioned concentrically within each other and concentrically about the clutch shaft to provide a compact package which slips over the clutch shaft and which is readily secured to the housing structure of the clutch and associated gear box.

24 Claims, 5 Drawing Sheets

ELECTRIC CLUTCH ACTUATOR

BACKGROUND OF THE INVENTION

This invention relates to clutch assemblies for motor vehicles and more particularly to an electric actuator for such a clutch assembly.

Internal combustion engines require some manner of device to bridge the gap between fly wheel and gear box input speeds when the vehicle begins to move. Such devices, with the ability to slip in a controlled manner, have taken many forms including disk clutches and torque converters. The torque converter allows two-pedal driving and provides smooth operation. However, it exhibits constant slip even at high speed, with associated fuel economy disadvantages and necessitates the use of a hydraulic circuit with consequent power losses. The manual disk clutch, by contrast, is rugged and expensive and does not slip during normal operation but requires attention and effort on the driver's part. In an attempt to eliminate some of the driver effort associated with a manual clutch, various actuator devices have been proposed which operate in response to a driver shift signal to engage and disengage the clutch, thereby relieving the driver of the clutching and declutching effort. However, the prior art clutch actuators have either not effectively carried out the clutching and declutching operations, have been prohibitively expensive, or have required unacceptable levels of maintenance with associated warranty problems.

SUMMARY OF THE INVENTION

This invention is directed to a clutch actuator which is effective in operation, inexpensive, and reliable over sustained periods of usage.

The invention actuator is intended for use with a motor vehicle of the type including a disk clutch, a gear box, a clutch shaft extending between the clutch and the gear box, clutch release members arrayed about the clutch shaft and operative to engage and disengage the clutch, and a housing structure in surrounding relation to the clutch, clutch shaft, and gear box. According to the invention, the actuator includes an annular electric motor positioned in concentric surrounding relation to the clutch shaft, with the clutch shaft passing freely and concentrically through the motor, and drive means operative in response to energization of the motor to engage and disengage the clutch. This arrangement provides a compact and efficient actuator package for readily and effectively engaging and disengaging the clutch.

According to a further feature of the invention, the actuator further includes an annular clutch release bearing adapted to be positioned concentrically around the clutch shaft between the motor and the clutch release members and including a non-rotating race and a rotating race adapted to engage and rotate with the clutch release members, and the drive means is operative in response to energization of the motor to move the clutch release bearing axially and thereby move the clutch release members in a manner to engage and disengage the clutch. This arrangement allows the annular electric motor of the invention to be utilized in conjunction with the traditional annular clutch release bearing to effectively engage and disengage the clutch.

According to a further feature of the invention, the motor includes an annular motor housing member sized to be mounted within the housing structure in concentric relation to the clutch shaft and an annular armature member positioned concentrically within the motor housing member in concentric relation to the clutch shaft; the drive means include nut means defined on the internal periphery of the annular armature member, an annular screw member positioned concentrically within the armature member in threaded engagement with the nut means, and means precluding rotation of the annular screw member; and the non-rotating bearing race of the release bearing is mounted on one of the actuator members. This arrangement allows the motor to be energized to produce relative axial movement as between the various members of the actuator to thereby move the clutch release bearing axially in a sense to engage or disengage the clutch. In one disclosed embodiment of the invention, the actuator member mounting the non-rotating bearing race is the annular screw member and in another disclosed embodiment the actuator member mounting the non-rotating bearing race is the annular housing member of the motor.

According to a further feature of the invention, the motor housing includes an annular hub portion positioned concentrically within the screw member in concentric relation to the clutch shaft and the rotation precluding means is defined at the annular interface of the housing hub portion and the screw member. This arrangement provides a ready and effective means of precluding rotation of the screw member and further provides a firm, large area annular support surface for the screw member.

According to a further feature of the invention, the non-rotating race is mounted on the selected adaptor member in a manner to allow limited axial movement of the non-rotating race relative to that member and the actuator further includes first position sensing means operative to sense relative axial movement between the non-rotating race and the selected actuator member and second position sensing means operative to sense the axial position of the selected member.

According to a further feature of the invention the first position sensing means comprises a switch mounted on the selected member in proximity to the non-rotating race, and the actuator further includes control means interconnected between the switch and the second position sensing means and operative in response to a signal from the switch to thereafter energize the motor to an extent to produce a predetermined amount of axial movement of the selected actuator member as measured by the second position sensing means. With this arrangement, the initial axial movement of the selected actuator member insures that a desired amount of preload is applied to the release bearing, whereafter the motor may be energized to move the release bearing axially by an amount predetermined to achieve the disengagement of the clutch.

The invention also embodies a clutch control system embodying the invention electric clutch actuator. In one disclosed system, the electric actuator is energized by an appropriate signal generated by depression of the clutch pedal of the vehicle and in another disclosed system the clutch pedal is eliminated and the signal energizing the electric actuator is generated by movement of the gear shift lever of the vehicle.

DETAILED DESCRIPTION OF THE PREFERRED EMBODIMENT

Figures 1, 3, 4:
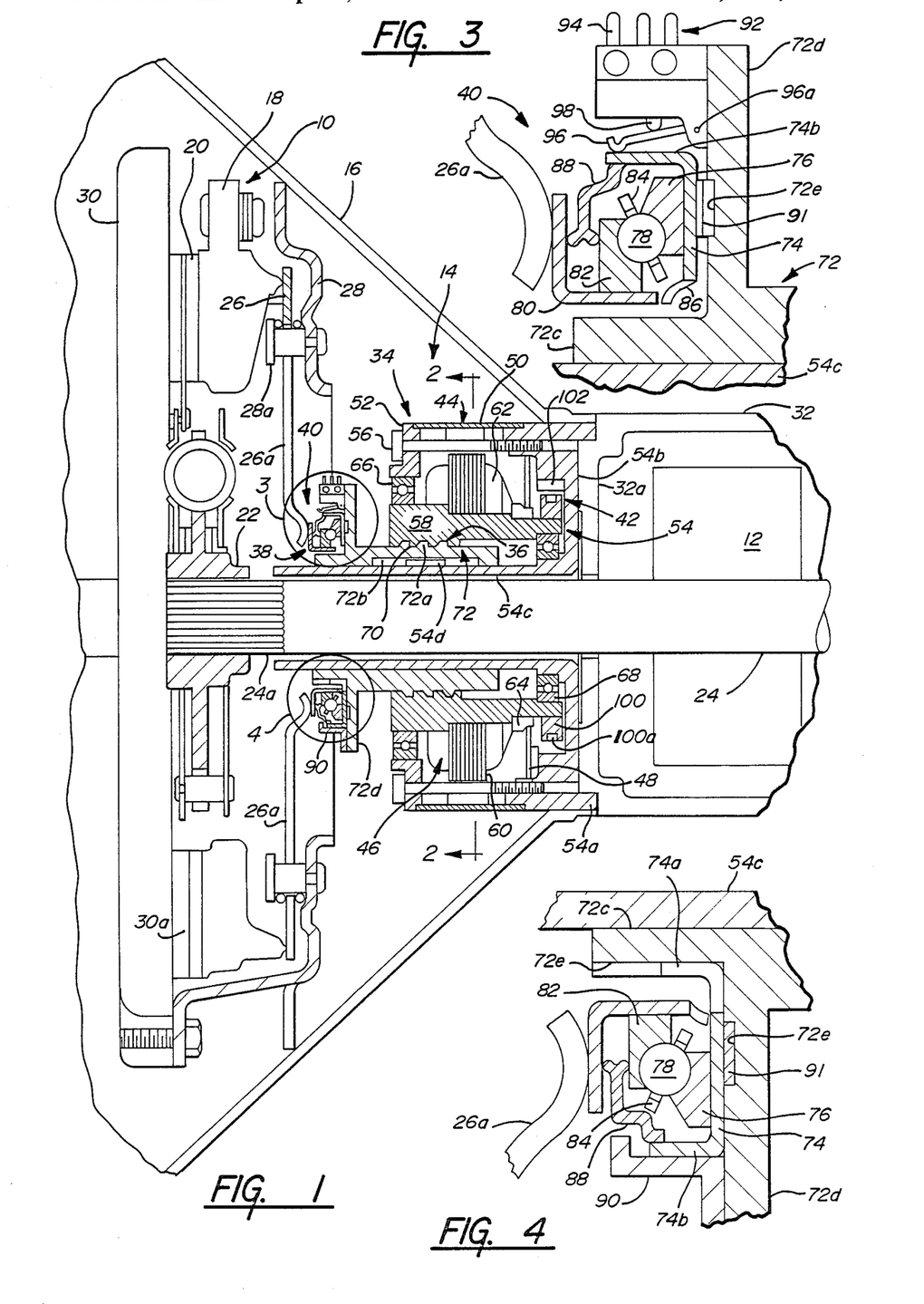
FIG. 1 is a cross-sectional somewhat schematic view showing the invention electric actuator embodied in a motor clutch and gear box assembly.
FIGS. 3 and 4 are detailed views taken respectively within the 3 and 4 of FIG. 1.
Figure 2:
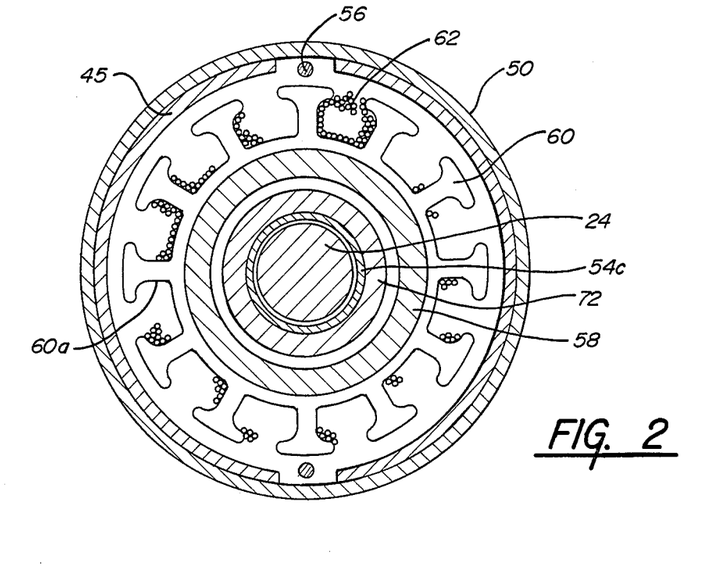
FIG. 2 is a cross-sectional view taken on line 2—2 of FIG. 1.

The clutch and gear box assembly seen in FIG. 1 includes a clutch 10, a gear box 12, and an actuator 14.

Clutch 10 is of known form and includes a clutch housing 16, a pressure plate 18, a clutch disk 20 drivingly connected to a central internally splined hub 22, a clutch shaft 24 having a splined portion 24a at its forward end for sliding and driving coaction with hub 22, a diaphragm spring 26 defining a plurality of circumferentially spaced clutch release fingers 26a, and a clutch cover 28 defining pivot posts 28a pivotally mounting the clutch release finger portions 26a. It will be understood that cover 28 is secured to the fly wheel 30 of the vehicle and that pivotal movement of clutch release fingers 26a moves pressure plate 18 forwardly and rearwardly to selectively clamp and release clutch disk 20 from clamping engagement between the pressure plate and friction material 30a carried by the rearward annular face of the fly wheel so as to engage and disengage the clutch and so as to selectively transmit power through hub 22 and through clutch shaft 24 to gear box 12.

Gear box 12 is shown in diagrammatic form and may comprise any manual gear box in which the vehicle operator may choose between a series of gear ratios by selective movement of a gear select lever (not shown). Gear box 12 includes a housing 32 which coacts with clutch housing 16 to form a clutch and gear box housing structure. Housing 16 and 32 will normally comprise separate housings but may, in certain applications, be formed as a single unitary housing. Housing 32 includes a forward annular housing wall 32a passing the rearward end of clutch shaft 24.

Actuator 14 includes a motor 34, drive means 36, a release bearing 38, position sensing means 40, and position sensing means 42.

Motor 34 includes a housing 44, permanent magnets 45, an armature assembly 46, and brushes 48.

Housing 44 includes an annular housing member 50, an annular front end cap 52, and an annular rear end cap 54. Rear end cap 54 includes an outer annular flange portion 54a, an annular radially extending rear end wall portion 54b, and a central hollow quill or hub portion 54c extending forwardly from rear end wall portion 54b and defining an annular through passage sized to loosely pass clutch shaft 24. Housing members 50, 52 and 54 are clampingly held together by a plurality of tie bolts 56.

Permanent magnets 45 are of arcuate configuration and are positioned in known manner on the circumferential interior of annular housing member 50 with their adjacent ends circumferentially spaced to pass through bolts 56.

Armature assembly 46 includes an annular armature member 58, a plurality of laminations 60 mounted in known manner on annular armature member 58 and defining axial passages 60a therebetween, windings 62 passing in known manner through passages 60a, and a commutator 64 secured to armature 58 rearwardly of laminations 60 and windings 62.

Brushes 48 extend between housing end cap 54 and commutator 64. Armature assembly 46 is rotatably mounted in motor housing 44 by a front ball bearing 66 and a rear ball bearing 68, and armature assembly 46 is caused to rotate within housing 44 in known manner upon energization of the armature assembly through brushes 48.

Drive means 36 includes nut means 70 defined on the inner periphery of annular armature member 58 and an annular screw 72 including external threads 72a threadably coacting with nut means 70. Annular screw 72 is sized to fit slidably over central housing quill 54c and is precluded from rotation relative to quill 54c by a key 54d carried by the quill and slidably received in a keyway 72b on the internal periphery of the annular screw. Annular screw 72 further includes a front annular hub portion 72c and a radial flange portion 72d. The coacting threads on nut means 70 and screw 72 may, for example, comprise acme threads.

Release bearing 38 is positioned around screw hub portion 72c proximate the front annular face of screw flange portion 72d and includes a rearward annular housing member 74, a non-rotating raceway 76 secured to the forward annular face of housing 74, a plurality of ball bearings 78, a front annular housing member or adaptor member 80, a rotating raceway 82 secured to adaptor member 80, a cage 84, and suitable seals 86 and 88. A plurality of circumferentially spaced clips 90 are secured to screw flange portion 72d. Clips 90 position the bearing in concentric relation to screw hub portion 72c and delimit axial movement of the bearing relative to the screw hub portion. A plurality of circumferentially spaced prong portions 74a extend radially inwardly from rearward housing member 74 for sliding engagement in grooves 72e provided at circumferentially spaced locations on screw hub portion 72c to preclude rotation of housing 74 and associated raceway 76 relative to the motor housing. A wave washer 91 is positioned in an annular groove 72e in the forward annular face of screw flange portion 72d and urges bearing housing member 74, and thereby bearing 38, forwardly relative to screw hub portion 72c.

Position sensing means 40 comprises a miniature snap action switch 92 mounted on the forward annular face of screw flange portion 72d radially outwardly of the forwardly extending portion 74b of non-rotating housing member 74. Switch 92 includes a plurality of terminals 94 and a switch lever 96. Lever 96 engages housing portion 74b and is pivotable about its rearward end 96a to selectively control a push button 98 which in turn selectively controls terminals 94 to provide an open position for the switch with the lever 96 in its raised position, as seen in FIG. 3, and a closed position for the switch with the lever in a lowered position, as seen in FIG. 1. Switch 92 may, for example, comprise a switch available from McGill Manufacturing Co. of Valparaiso, Indiana as Part No. 4906-2110 Series.

Position sensing means 42 includes an annular member 100 carried on the rearward end of armature member 58, a plurality of magnet segments 100a positioned at circumferential locations about annular member 100, and a proximity switch 102, such for example as a Hall Effect switch, positioned radially outwardly of annular member 100 and mounted on housing end cap 54.

Motor 34 is sized to be mounted within clutch housing 16 in concentric surrounding relation to clutch shaft 24 with the clutch shaft 24 passing centrally and freely through housing quill portion 54c for coaction with gear box 12. Motor 34 is rigidly positioned within the clutch housing by positioning housing flange portion 54a on an annular seat 32b defined by gear box housing forward wall 32a with the flange housing 54a suitably clamped between clutch housing 16 and the gear box housing so as to mount the actuator rigidly within the clutch housing. When mounted within the clutch housing, the adaptor member 80 of release bearing 38 is urged into contact with the spring fingers 26a of the diaphragm spring of the clutch assembly. When motor 34 is energized through brushes 48, armature assembly 58 rotates, causing screw 72 to advance or retract linearly with respect to the armature assembly so as to move the release bearing 38 forwardly or rearwardly relative to release fingers 26a and respectively disengage and engage the clutch. With the clutch in its engaged position, wave washer 91 acts to urge release bearing 38 forwardly with respect to screw 72, as seen in FIG. 3, so as to maintain contact with spring fingers 26a and maintain lever 96 of switch 92 in an open position. During the initial forward movement of screw 72 upon energization of motor 34 in a sense to disengage the clutch, release bearing 38 moves rearwardly relative to screw 72 with the relative movement being allowed and resisted by wave washer 91. After a predetermined amount of such rearward movement of the bearing relative to screw 72, lever 96, as seen in FIG. 1, moves clear of the forwardly extending portion 74b of bearing housing member 74 to allow the lever to move to its downwardly pivoted position in which switch 92 is closed to generate a control signal indicating that the bearing has been preloaded to a predetermined desired extent. The preload signal would preferably, but not necessarily, be generated at such time as the radial portion 74b of housing 74 moves into bottoming engagement with the forward annular face of screw flange portion 72d, as seen in FIG. 4.

The signal thus generated by switch 92 is suitably relayed to proximity switch 102 which proceeds to count a predetermined number of revolutions of the armature assembly as measured by the passage of the magnetic segments 100a. After a predetermined number of revolutions of the armature assembly has been counted, indicative of sufficient forward linear movement of the bearing 38 such as is required to disengage the clutch, a signal is transmitted to the motor to deenergize the motor so as to terminate forward linear movement of the screw and of the release bearing. When it is desired to reengage the clutch, a suitable signal is sent to the motor 34 to energize the motor in a sense to move screw 72 linearly rearwardly. As the screw moves linearly rearwardly, the clutch is gradually engaged and the spring fingers 26a gradually pivot back to their home or retracted position. As the fingers 26a are moving toward their home or retracted position, they maintain bearing 38 in a position relative to screw 72 wherein wave washer 91 is flattened and the rear housing member 74 of the bearing is bottomed against screw flange portion 76d. At such time as the spring fingers 26a arrive at their home or retracted position, the fingers and the bearing cease moving rearwardly but the screw 72 continues to move rearwardly so that relative movement occurs between bearing 38 and screw 72. During this relative movement, wave washer 91 moves to its illustrated position of FIG. 3 in which the bearing housing member 74 has moved away from screw flange 72d. As the bearing arrives at the position seen in FIG. 3 relative to the screw, switch lever 96 is actuated upwardly to move push button 98 upwardly to in turn open switch 92 and terminate the energization of the motor so that the screw, bearing, and spring fingers are halted in their disengaged position as seen in FIG. 3.

Figure 5:
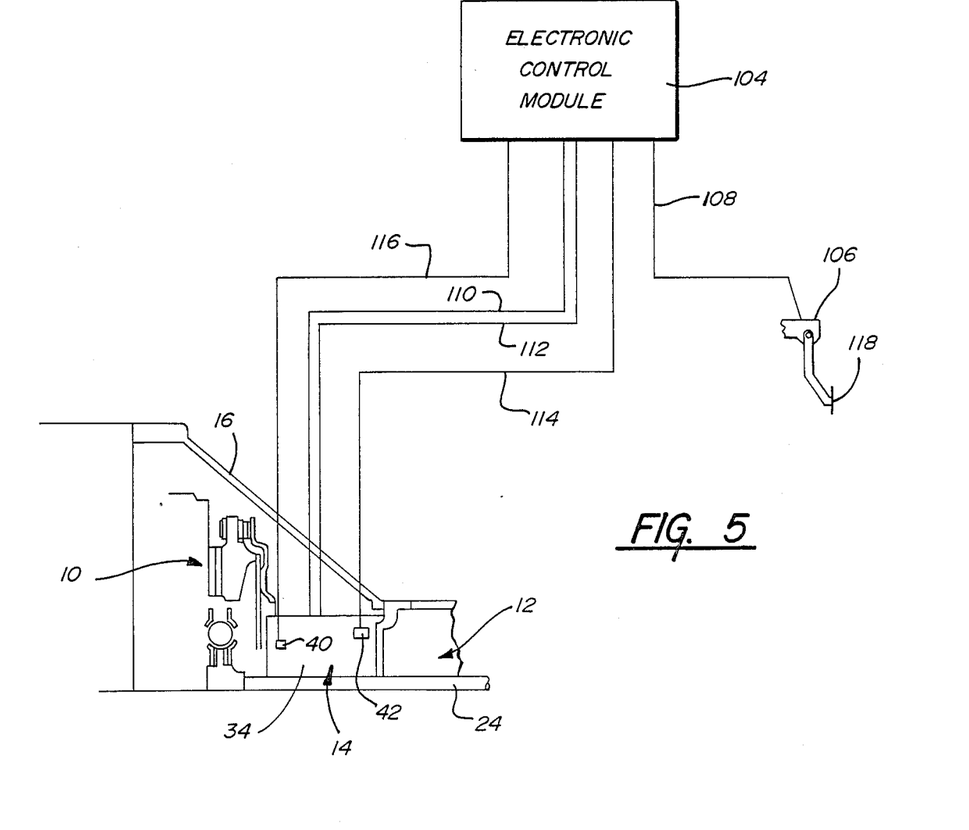
FIG. 5 a diagrammatic view of a clutch control system employing an electric actuator according to the invention.

Actuator 14 is seen in FIG. 5 embodied in a clutch and gear box control system. The control system of FIG. 5, in addition to actuator 14, includes an electronic control module 104; a clutch pedal position sensor 106 connected to control module 104 by a lead 108; leads 110 and 112 connecting control module 104 to electric motor 34; a lead 114 connecting module 104 to position sensor 42; and a lead 116 connecting module 104 to preload sensing means 40.

In the system of FIG. 5, with the clutch in its engaged position, a slight downward pivotal movement of clutch pedal 118 actuates switch 106 in a sense to transmit a signal to control module 104 that the vehicle operator desires to disengage the clutch. Control module 104 functions in known manner to generate a signal through wires 110, 112 to energize motor 34 in a sense to advance screw 72 of motor 34 forwardly in a clutch disengage direction. The screw 72 of the motor moves forwardly until switch 92 of preload sensing means 40 generates a control signal indicating that bearing housing 74 has bottomed against screw flange 72d whereafter control module 104 transmits a signal to position sensing means 42 to begin counting the revolutions of the armature assembly. After a predetermined number of revolutions have been counted, corresponding to the amount of linear movement required to achieve disengagement of the clutch, control module 104 functions to deenergize motor 34 to hold the clutch in its disengaged position until a further operator signal is received. The further operator signal, which may for example comprise release of the clutch pedal by the vehicle operator to actuate switch 106 in the opposite sense to which it was initially actuated, is transmitted by control module 104 which functions to energize motor 34 in a sense to retract screw 72. After the screw has retracted to the point where spring fingers 26a have returned to their retracted or home position and the screw has thereafter moved the further distance, as indicated in FIG. 3, necessary to move the bearing housing 74 away from screw flange 72d, lever 96 of switch 92 is actuated in a sense to transmit a signal to control module 104 to deenergize the motor.

Figure 6:
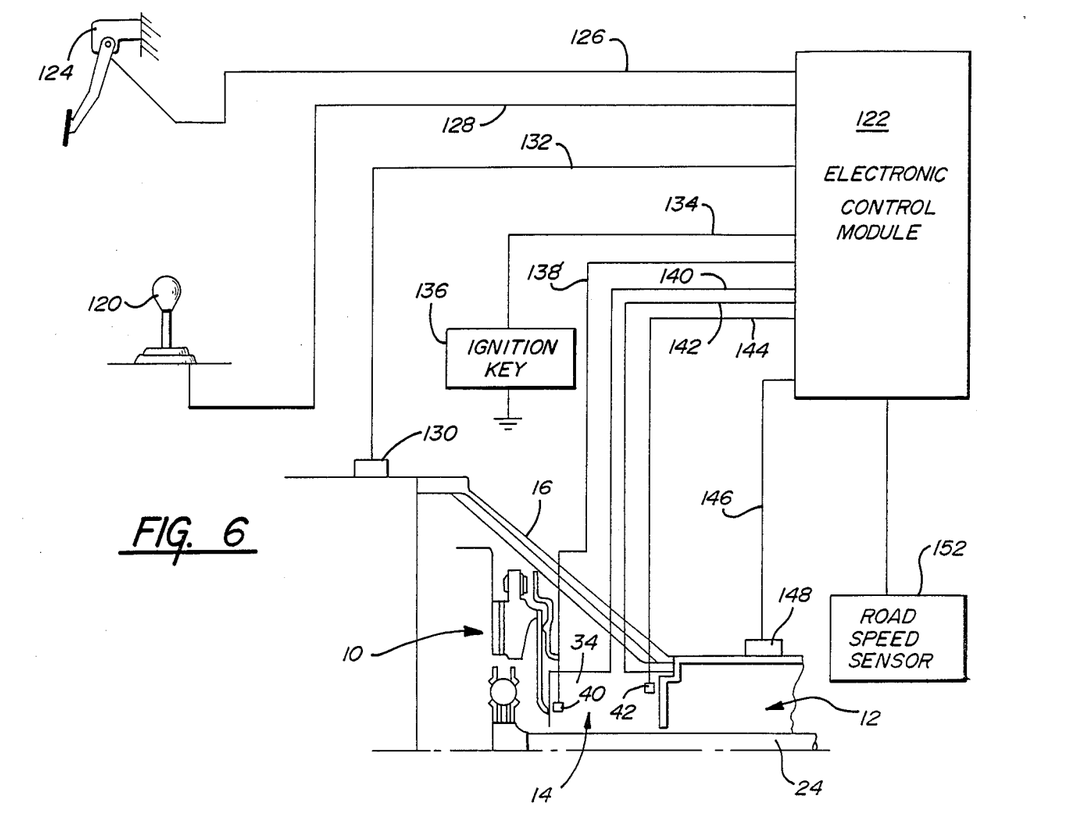
FIG. 6 is a view of a further clutch control system employing an electric actuator according to the invention.

In the clutch and gear box control system of FIG. 6, the clutch pedal is eliminated and the actuator 14 is controlled by movement by the gear shift lever 120 of the vehicle. In addition to actuator 14 and gear shift lever 120, the control system of FIG. 6 includes an electronic control module 122; a throttle position sensor 124 connected to module 122 by a lead 126; a lead 128 connecting gear shift lever 120 to control module 122; an engine speed sensor 130 connected to module 122 by a lead 132; a lead 134 connecting the ignition key 136 of the vehicle to module 122; a lead 138 connecting preload sensing means 140 to module 122; leads 140 and 142 connecting motor 34 to module 122; a lead 144 connecting position sensing means 42 to module 122; a lead 146 connecting a gear box input speed sensor 148 to module 122; and a lead 150 connecting a road speed sensor 152 to module 122.

In the system of FIG. 6, the signal to actuator 14 to energize and deenergize the clutch is controlled by shift lever 120 and, specifically, the signal to disengage the clutch is generated by pressure on the lever 120, such as occurs during the shifting of lever 120 from one shift position to another, and disengagement of the clutch is instigated by release of operator pressure on lever 120. Module 122 receives an engage or disengage signal from shift lever 120 and, if the signals received from throttle position sensor 124, engine speed sensor 130, gear box input speed sensor 148, and road speed sensor 152 are compatible with the requested engage or disengage action, transmits the appropriate control signal through leads 140, 142 to motor 34 to move screw 72 linearly in a sense to engage or disengage the clutch with preload sensing means 40 and position sensing means 42 functioning in the manner described with respect to the detailed description of actuator 14 and with respect to the control system of FIG. 5.

Figure 7:
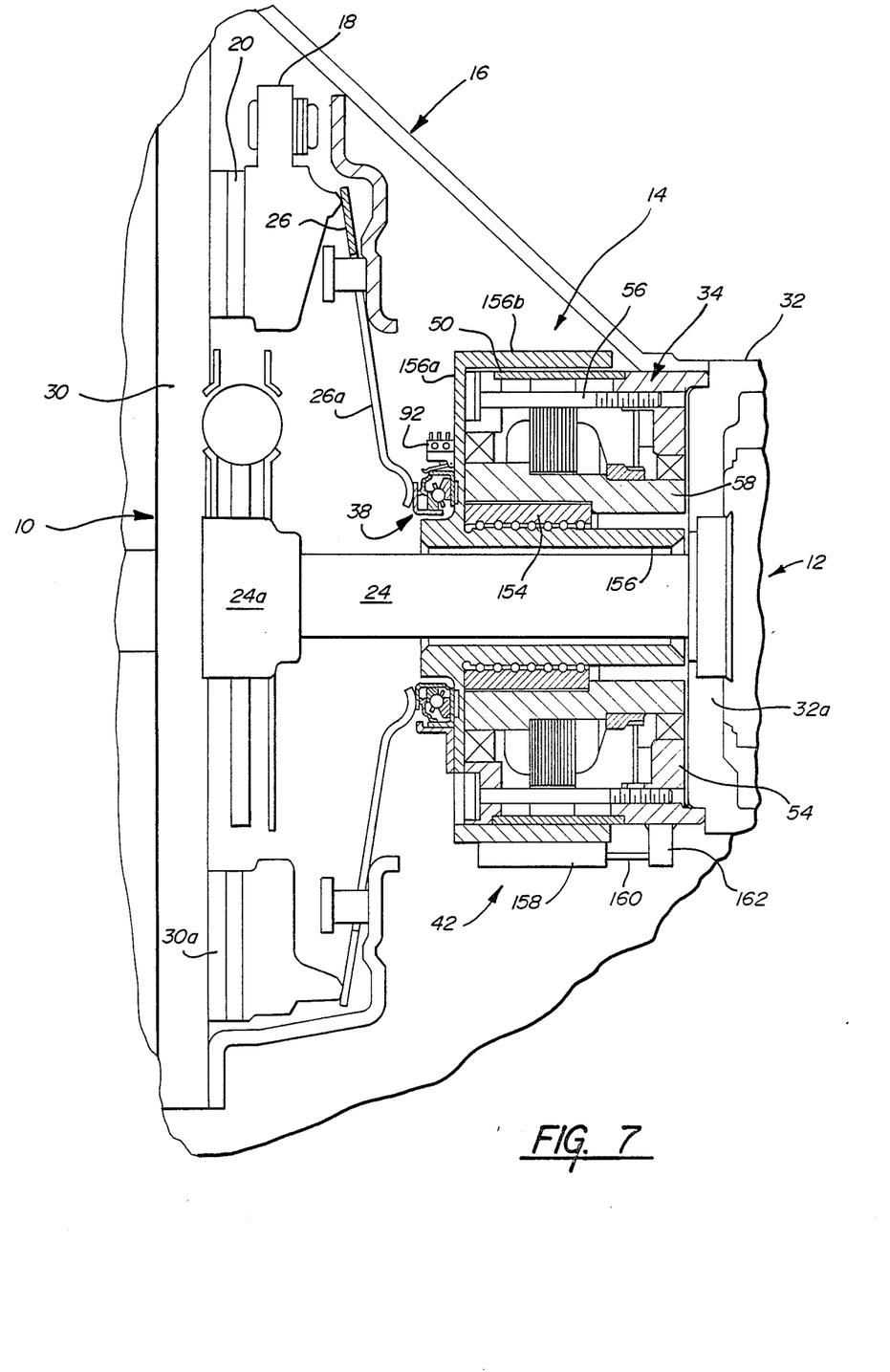
FIG. 7 is a cross-sectional view of a modified form of electric actuator according to the invention.
Figure 8:
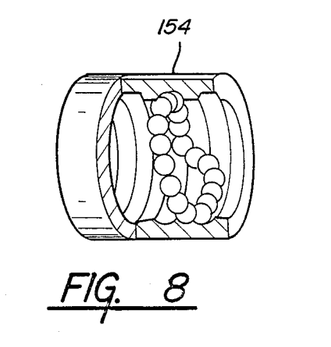
FIGS. 8 and 9 are detailed views of a ball screw assembly employed in the actuator of FIG. 7.
Figure 9:
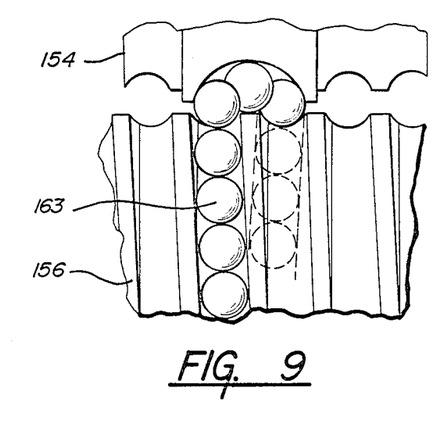

A modified form of actuator is disclosed in FIG. 7. The actuator seen in FIG. 7 is generally similar to the actuator of FIG. 1 with the exceptions that the nut means 70 of FIG. 1 is constituted by a separate ball nut 154 positioned concentrically and fixedly within armature 58; the central hollow quill 54c of the housing is eliminated; screw 72 is constituted by a ball screw 156; a radial flange portion 156a of the ball screw extends outwardly beyond the outer perimeter of bearing 38 and radially beyond switch 92; ball screw 156 further includes an axially extending annular cover portion 156b positioned radially outwardly of housing annular member 50 to provide a dust and contaminate shield for the motor 34; and the position sensing means 42 comprises a potentiometer 158 positioned on the outer periphery of ball screw cover portion 156b and coacting with a fixed rod 160 secured to housing end cap 54 by a bracket 162 to provide an instantaneous indication of the axial position of screw 156 relative to motor housing 44. Ball nut 154 and ball screw 156 may be of any known type but preferably are of the internal ball return type wherein, after each turn, and as best seen in FIGS. 8 and 9, the balls 163 are fed back to the previous turn by a floating liner situated inside the nut. The actuator of FIG. 7 operates in the control system of FIG. 5 or the control system of FIG. 6 in the same manner previously described with respect to the actuator of FIG. 1.

Figures 10, 11:
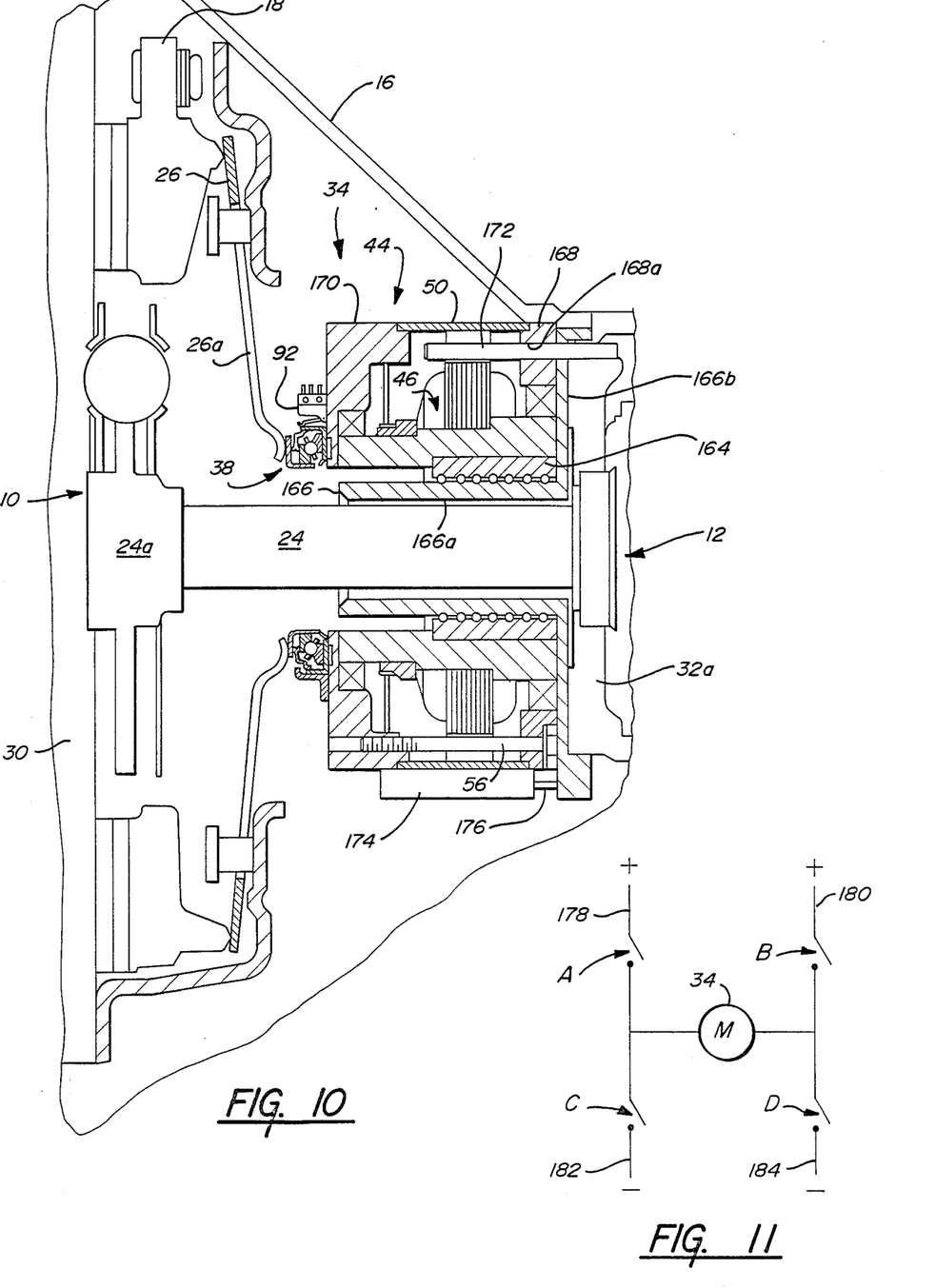
FIG. 10 is a cross-sectional view of a further modified form of electric actuator according to the invention.
FIG. 11 is a detailed view of a motor control circuit usable in any of the disclosed actuator embodiments.

The actuator of FIG. 10 is generally similar to the actuator of FIG. 1 with the exception that the nut means 70 of FIG. 1 is replaced by a ball nut 164; the screw 72 of FIG. 1 is replaced by a ball screw 166 having a main body threaded portion 166a for threaded coaction with ball nut 164 and a radial flange portion 166b adapted to be fixedly secured to gear box end wall 32a; the motor housing 44 includes a rear end cap 168 defining a plurality of axial bores 168a and a front end cap 170; the front end cap 170 carries switch 92 and release bearing 38; and a plurality of guide pins 172 are secured to gear box front wall 32a and extend forwardly therefrom through ball screw flange portion 166b for sliding receipt in bores 168a of rear housing end cap 168. In the operation of the actuator of FIG. 10, energization of the motor 34 and consequent rotation of armature assembly 46 results in axial movement of motor housing 44 along guide pins 172 with a consequent linear movement of release bearing 38 to engage and disengage the clutch in the manner previously described with respect to the FIG. 1 and the FIG. 7 embodiments of the actuator. The position sensor 42 in the FIG. 7 embodiment comprises a potentiometer 174 secured to housing member 50 and coacting with a fixed rod 176 fixed to ball screw flange portion 166b to provide an instantaneous indication of the axial position of the housing relative to the fixed portions of the actuator. The actuator of FIG. 10 functions in the control system of FIG. 5 or the control system of FIG. 6 in a manner similar to the operation described with respect to the actuator of FIG. 1.

Whereas, in each of the disclosed actuator embodiments, the back EMF of the motor 34 in combination with the lead of the nut and screw of the drive means will normally be sufficient to preclude back driving of the motor by the clutch assembly with the clutch in its disengaged position, it may be necessary in some applications to augment the back EMF of the motor and the resistance provided by the lead of the nut and screw assembly by the use of dynamic braking of the motor. Specifically, as seen in FIG. 11, the motor 34 may be made a part of an H-bridge in which switches A and B are provided in the two positive leads 178 and 180 and further switches C and D are provided in negative leads 182 and 184 of the H-bridge. With this H-bridge arrangement, the motor may be driven in a forward sense by the closing of switches A and B; may be driven in a backward or rearward sense by the closing of switches B and C; and may be dynamically braked by the closing either of switches A and B or of switches C and D. The switching of the switches A, B, C and D may be controlled in a known manner by the control module 104 of the control system of FIG. 5 or the control module 122 of the control system of FIG. 6. In either system, the appropriate module will function upon the arrival of the clutch at its fully disengaged or fully engaged position to close either switches A and B or switches C and D to thereby dynamically brake the motor. The dynamic breaking action not only serves, with the clutch in its disengaged position, to augment the resistance to back driving provided by the lead of the nut and screw and the back EMF of the motor, but also functions to provide a more rapid and more precise stoppage of the motor at such time as the clutch has arrived at either its fully disengaged or fully engaged position.

The invention electric clutch actuator will be seen to provide a compact, inexpensive and reliable means of readily engaging and disengaging the clutch of the associated motor vehicle so as to retain the ruggedness, lack of slip, and low cost of a manual transmission arrangement while substantially eliminating the driver effort required to achieve the necessary clutch engagement and disengagement during changing of the gear ratios of the associated gear box.

Whereas preferred embodiments of the invention have been illustrated and described in detail, it will be apparent that various changes may be made in the disclosed embodiments without departing from the scope or spirit of the invention. For example, whereas the invention clutch actuator has been illustrated and described in association with a push-type clutch assembly wherein the rotating race of the release bearing pushingly engages the clutch release members, the invention clutch actuator may also be employed in association with a pull-type clutch wherein the rotating race of the release bearing pullingly engages the clutch release members.

We claim:

1. An actuator for use with a motor vehicle of the type including a disk clutch, a gear box, a clutch shaft extending between the clutch and the gear box, clutch release elements arrayed about the clutch shaft and operative to engage and disengage the clutch and a housing structure in surrounding relation to the clutch, clutch shaft and gear box, said actuator comprising:
   (A) an annular electric motor sized to be mounted within the housing structure and including a rotary annular armature member in concentric surrounding relation to the clutch shaft with the clutch shaft passing freely and centrally through said armature member;
   (B) an annular clutch release bearing adapted to be positioned concentrically around the clutch shaft between said motor and the clutch release elements and including a non-rotating race and a rotating race adapted to engage and rotate with the clutch release elements; and
   (C) drive means operative in response to rotation of said armature member upon energization of said motor to move said clutch release bearing axially to thereby move the clutch release elements in a manner to engage and disengage the clutch.

2. An actuator according to claim 1 wherein:
   (D) said motor includes an annular motor housing member sized to be mounted within the housing structure in concentric relation to the clutch shaft with said annular armature member positioned concentrically within said motor housing member in concentric relation to the clutch shaft;
   (E) said drive means includes
      (1) nut means defined on the internal periphery of said annular armature member;
      (2) an annular screw member positioned concentrically within said armature member in threaded engagement with said nut means; and
      (3) means precluding rotation of said annular screw member; and
   (F) said non-rotating bearing race is mounted on one of said members.

3. An actuator according to claim 2 wherein:
   (G) said one member is said screw member.

4. An actuator according to claim 2 wherein:
   (G) said one member is said housing member.

5. An actuator according to claim 4 wherein:
   (H) said actuator includes a plurality of axially extending guide pins adapted to be secured to the housing structure;
   (I) said housing member includes journal means slidably receiving said guide pins; and
   (J) said annular screw member includes a radial flange portion at one end thereof adapted to be secured to the housing structure so as to preclude rotation and axial movement of said screw member.

6. An actuator according to claim 2 wherein:
   (G) said nut means comprises a ball nut; and
   (H) said screw member comprises a ball screw.

7. An actuator according to claim 2 wherein:
   (G) said housing includes an annular hub portion positioned concentrically within said screw member in concentric relation to the clutch shaft; and
   (H) said rotation precluding means is defined at the annular interface of said housing hub portion and said screw member.

8. An actuator according to claim 2 wherein:
   (G) said motor further includes permanent magnets positioned on the interior of said housing member in concentric relation to said armature member, a commutator carried by said armature member, and brushes extending between said housing member and said commutator.

9. An actuator according to claim 2 wherein:
   (G) said non-rotating race is mounted on said one member in a manner to allow limited axial movement of said non-rotating race relative to said one member; and
   (H) said actuator further includes first position sensing means operative to sense relative axial movement between said nOn-rOtating race and said one member and second position sensing means operative to sense the axial position of said one member.

10. An actuator according to claim 9 wherein:
   (I) said first position sensing means comprises a switch mounted on said one member in proximity to said non-rotating race; and
   (J) said actuator further includes control means interconnected between said switch and said second position sensing means and operative in response to a signal from said switch to thereafter energize said motor to an extent to produce a predetermined amount of axial movement of said one member as measured by said second position sensing means.

11. An actuator according to claim 10 wherein:
   (K) said actuator further includes bearing preload means.

12. An actuator according to claim 11 wherein:
   (L) said bearing preload means comprises a wave spring positioned between said non-rotating race and said one member.

13. An actuator for use with a motor vehicle of the type including a disk clutch, a gear box, a clutch shaft extending between the clutch and the gear box, clutch release elements arrayed about the clutch shaft and operative to engage and disengage the clutch and a housing structure in surrounding relation to the clutch, clutch shaft, and gear box, said actuator comprising:
   (A) an electric motor housing member sized to be mounted within the housing structure in concentric relation to the clutch shaft;
   (B) an annular armature member positioned concentrically within said motor housing member in concentric relation to the clutch shaft;
   (C) nut means defined on the internal periphery of said annular armature member;
   (D) an annular screw member positioned concentrically within said armature member in threaded engagement with said nut means;
   (E) a clutch release bearing including a non-rotating race mounted on one of said members and a rotating race adapted to engage and rotate with the clutch release elements;
   (F) means precluding rotation of said annular screw member;

(G) energizing means operative to rotate said armature member within said motor housing member and thereby generate relative axial movement between said armature member and said screw member; and (H) means operative in response to such relative axial movement to move said one member axially and thereby move the clutch release elements in a manner to engage and disengage the clutch.

14. A clutch assembly for a motor vehicle comprising:

(A) a disk clutch including a driven disk and a clutch shaft drivingly connected to said driven disk;

(B) an annular electric motor including a rotary annular armature member positioned in concentric surrounding relation to said clutch shaft with said clutch shaft passing freely and concentrically through said armature member; and (C) drive means operative in response to rotation of said armature member upon energization of said motor to engage and disengage said clutch.

15. A clutch assembly according to claim 14 wherein:

(D) said drive means includes nut means carried by and positioned concentrically within said armature member in surrounding relation to said clutch shaft and an annular screw member positioned concentrically within said nut means in surrounding relation to said clutch shaft and threadably engaging said nut means.

16. A clutch assembly according to claim 15 wherein:

(F) said motor further includes an annular housing member concentrically surrounding said armature member; and (G) said drive means further includes a plurality of clutch release elements arrayed about said clutch shaft and a clutch release bearing having a nonrotating race mounted on one of said members and a rotating race engaging and rotating with said clutch release elements.

17. A clutch assembly according to claim 16 wherein:

(H) said one member is said screw member.

18. A clutch assembly according to claim 16 wherein:

(H) said one member is said housing member.

19. A control system for a motor vehicle of the type including a disk clutch, a gear box, a clutch shaft extending between the clutch and the gear box, and a housing structure in surrounding relation to the clutch, clutch shaft, and gear box, said control system comprising:

(A) an annular electric motor sized to be mounted within the housing structure and including a rotary annular armature member in concentric surrounding relation to the clutch shaft with the clutch shaft passing freely and centrally through said armature member;

(B) drive means operative in response to rotation of said armature member upon energization of said motor to engage and disengage the clutch;

(C) a vehicle control member selectively movable by the vehicle operator; and (D) control means operative in response to operator movement of said control member to selectively energize and deenergize said motor to thereby selectively rotate said armature member and selectively engage and disengage said clutch.

20. A control system according to claim 19 wherein;

(E) said drive means includes nut means carried by and positioned concentrically within said armature member in surrounding relation to said clutch shaft and an annular screw member positioned concentrically within said nut means in surrounding relation to said clutch shaft and threadably engaging said nut means.

21. A control system according to claim 20 wherein:

(F) said motor further includes an annular housing member concentrically surrounding said armature member; and (G) said drive means further includes a plurality of clutch release elements arrayed about said clutch shaft and a clutch release bearing having a nonrotating race mounted on one of said members and a rotating race engaging and rotating with said clutch release elements.

22. A control system according to claim 19 wherein:

(E) said control means includes an electric control module electrically connected to said motor and means operative in response to operator movement of said control member to transmit an electrical control signal to said control module.

23. A control system according to claim 22 wherein the motor vehicle includes a clutch pedal and wherein:

(F) said control member is the clutch pedal of the vehicle.

24. A control system according to claim 22 wherein the motor vehicle includes a shift lever and wherein:

(F) said control member is the shift lever of the vehicle.

* * * * *